(12) United States Patent
Cobanoglu et al.

(10) Patent No.: US 10,754,486 B2
(45) Date of Patent: Aug. 25, 2020

(54) COMPOSITE YARN FOR THE POSITION SENSITIVE CAPACITIVE TOUCH SENSING

(71) Applicant: Sanko Tekstil Isletmeleri San. Ve Tic. A.S., Inegol—Bursa (TR)

(72) Inventors: Ozgur Cobanoglu, Inegol—Bursa (TR); Fehim Caglar, Inegol—Bursa (TR); Semih Kazanc, Inegol—Bursa (TR); Deniz Iyidogan, Inegol—Bursa (TR); Seref Agzikara, Inegol—Bursa (TR); Ertug Erkus, Inegol—Bursa (TR); Erkan Evran, Inegol—Bursa (TR); Nafiz Eren, Inegol—Bursa (TR); Onur Birkan Oguz, Inegol—Bursa (TR); Nurullah Selcuk, Inegol—Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 16/412,866

(22) Filed: May 15, 2019

(65) Prior Publication Data
US 2019/0354242 A1 Nov. 21, 2019

(30) Foreign Application Priority Data
May 16, 2018 (EP) .................................... 18172676

(51) Int. Cl.
*G06F 3/045* (2006.01)
*G06F 3/044* (2006.01)
(Continued)

(52) U.S. Cl.
CPC ......... *G06F 3/0446* (2019.05); *D03D 1/0088* (2013.01); *D03D 15/0027* (2013.01)

(58) Field of Classification Search
CPC .................. G06F 3/044; G06F 3/0446; G06F 2203/04102; G06F 2203/04103;
(Continued)

(56) References Cited

U.S. PATENT DOCUMENTS

| 5,286,923 A * | 2/1994 | Prudhon | ............... H01B 7/0233 174/107 |
| 7,528,082 B2 * | 5/2009 | Krans | ....................... G09F 9/33 442/203 |

(Continued)

FOREIGN PATENT DOCUMENTS

| EP | 1176610 | 1/2002 |
| WO | 2004003273 | 1/2004 |

(Continued)

OTHER PUBLICATIONS

Search report and written opinion dated Oct. 30, 2018 for European priority application No. EP18172676.1.
(Continued)

*Primary Examiner* — Joe H Cheng
(74) *Attorney, Agent, or Firm* — Silvia Salvadori

(57) ABSTRACT

It is disclosed a composite yarn (1) comprising an electrically conductive yarn (2) and an electrically resistive yarn (3), wherein said electrically conductive yarn (2) is coupled to said electrically resistive yarn (3), and wherein the electrically conductive yarn (2) is electrically insulated from the electrically resistive yarn (3). It is further disclosed a touch sensor (10) comprising at least one composite yarn (1) according to anyone of the previous claims, and a detection device (5) configured to evaluate the capacitance values (CR, CC) of the electrically resistive yarn (3) and of the electrically conductive yarn (2) of said composite yarn (1), said detection device (5) being configured to calculate the ratio (CR/CC) between said capacitance values (CR, CC) of the electrically resistive yarn (3) and of the electrically
(Continued)

conductive yarn (2) and to provide an output signal (SOUT) indicative of the location of a touch event along said composite yarn (1) in function of said ratio (CR/CC).

17 Claims, 4 Drawing Sheets

(51) Int. Cl.
*D03D 1/00* (2006.01)
*D03D 15/00* (2006.01)

(58) Field of Classification Search
CPC ........ D03D 1/00; D03D 1/0088; D03D 15/00; D03D 15/0027; D03D 15/02; D02G 3/441; D10B 2101/20; D10B 2401/16
See application file for complete search history.

(56) References Cited

U.S. PATENT DOCUMENTS

| | | | | |
|---|---|---|---|---|
| 9,588,625 | B2* | 3/2017 | Poupyrev | G06F 3/044 |
| 9,693,592 | B2* | 7/2017 | Robinson | A41D 1/005 |
| 9,983,747 | B2* | 5/2018 | Poupyrev | D03D 1/0088 |
| 10,145,036 | B1* | 12/2018 | Sunshine | D03D 15/0027 |
| 10,175,781 | B2* | 1/2019 | Karagozler | G06F 3/03547 |
| 10,268,321 | B2* | 4/2019 | Poupyrev | G06F 3/044 |
| 10,285,456 | B2* | 5/2019 | Poupyrev | G06F 3/044 |
| 10,338,755 | B2* | 7/2019 | Podhajny | G06F 3/0416 |
| 10,385,487 | B2* | 8/2019 | Jeon | D03D 13/004 |
| 2006/0258247 | A1* | 11/2006 | Tao | D03D 1/0088 |
| | | | | 442/301 |
| 2007/0197115 | A1* | 8/2007 | Eves | D03D 1/0088 |
| | | | | 442/194 |
| 2009/0018428 | A1* | 1/2009 | Dias | A41D 13/1281 |
| | | | | 600/388 |
| 2010/0218597 | A1* | 9/2010 | McCoy | G01M 3/045 |
| | | | | 73/40 |
| 2013/0260630 | A1* | 10/2013 | Ito | D03D 1/00 |
| | | | | 442/205 |
| 2014/0262478 | A1* | 9/2014 | Harris | H05K 9/009 |
| | | | | 174/393 |
| 2015/0280102 | A1* | 10/2015 | Tajitsu | G01L 1/16 |
| | | | | 310/338 |
| 2016/0145776 | A1* | 5/2016 | Roh | D02G 3/441 |
| | | | | 57/211 |
| 2016/0283101 | A1* | 9/2016 | Schwesig | A41D 1/002 |
| 2017/0029985 | A1* | 2/2017 | Tajitsu | D03D 1/0088 |
| 2018/0005766 | A1* | 1/2018 | Fairbanks | H01G 9/2095 |
| 2018/0113032 | A1* | 4/2018 | Dickey | H03K 17/962 |
| 2018/0195210 | A1* | 7/2018 | Sunshine | D02G 3/441 |

FOREIGN PATENT DOCUMENTS

| | | |
|---|---|---|
| WO | 2011099804 | 8/2011 |
| WO | 2014/092781 | 6/2014 |
| WO | 2016154561 | 9/2016 |

OTHER PUBLICATIONS

International search report and written opinion dated Jul. 26, 2019 for PCT application No. PCT/EP2019/062667.

* cited by examiner

COMPOSITE YARN FOR THE POSITION SENSITIVE CAPACITIVE TOUCH SENSING

This application is a U.S. Non-Provisional application which claims priority to and the benefit of European Patent Application no. 18172676.1 filed on May 16, 2018, the content of which is incorporated herein by reference in its entirety.

TECHNICAL FIELD

The present invention relates to the field of the capacitive sensing. In particular, the present invention relates to a composite yarn for a fabric implementing a touch sensor.

BACKGROUND

Capacitive touch sensors comprise a plurality of electrically conductive wires, electrically insulated from each other, and arranged to form a grid.

Capacitive touch sensors may employ the "self-capacitance sensing" technique wherein each sensing wire is connected to a controller configured to evaluate the capacitance value of each sensing wire, i.e. independently to each other. In these capacitive touch sensors, the controller is configured to detect the change of value in the capacitance of each sensing wire due to the parasitic capacitance provided by an object (e.g. a finger) touching the sensing wire. The position of a touch event is determined by the controller by detecting which sensing wires (i.e. which rows and columns) of the capacitive grid are touched, so that the position of the touch is determined as X, Y coordinates on the capacitive grid.

Some capacitive touch sensors employ the "mutual capacitance sensing" technique wherein the controller is configured to evaluate sequentially the mutual capacitance value at each intersection of sensing wires. In other words, the controller is configured to evaluate the capacitance value of each capacitor formed between sensing wires for each row and each column of the capacitive grid. A touch of an object (e.g. a finger) on the capacitive grid is detected as a change of value in the mutual capacitance.

Capacitive touch sensors embedded in a fabric are known. For example, US2016048235A1 discloses a fabric implementing a capacitive touch sensing comprising a plurality of electrically conductive wires, electrically insulated from each other, and arranged to form a grid.

Each wire is connected to a controller configured to evaluate the capacitance value of each wire (i.e. using the "self-capacitance sensing"). The controller detects the position of a touch event by detecting which horizontal wire and which vertical wire is touched, by detecting changes in capacitance of each respective wire of the capacitive grid. The controller uses the intersection of the crossing wires that are touched to determine the position of the touch event on the capacitive grid, so that the position of the touch is determined as X, Y coordinates on the capacitive grid.

The capacitive grid can be embedded in a fabric by using the electrically conductive wires as weft yarns and warp yarns. However, each electrically conductive wire of the capacitive grid (vertical and horizontal wires) have to be electrically connected to a sensing circuit by means of electrical contacts arranged along both the vertical side and the horizontal side of the capacitive grid. The routing of the electrical connections between the capacitive grid and the sensing circuit may be very complex when the capacitive grid has a great number of electrically conductive wires.

Furthermore, in case of a touch sensor having a substantially rectangular form (i.e. having a number of horizontal wires different with respect to the number of vertical wires) or provided with electrically conductive wires arranged parallel along only one direction (e.g. in case of a swipe sensor), the arrangement of the electrical contacts and the routing of the electrical connections between the conductive wires and the sensing circuit may be very difficult to be designed, making the production of the touch sensor complex and expensive and in some cases causing a stiffening of the touch sensor structure.

SUMMARY OF THE INVENTION

An object of the present invention is to overcome the drawbacks of the prior art cited above and to provide a composite yarn that allows to produce a touch sensor having a simple routing of the electrical connections.

A further object of the present invention is to provide a touch sensor and a method for detecting the location of touch event on a support layer (for example a fabric) able to detect the touch event in a precise and reliable way.

These and other objects are achieved by the present invention by a composite yarn, a touch sensor, and a method for detecting a touch event according to the independent claims. Preferred aspects of the invention are recited in dependent claims.

In particular, according to the present invention, the composite yarn comprises an electrically conductive yarn and an electrically resistive yarn, wherein the electrically conductive yarn is coupled to the electrically resistive yarn, and wherein the electrically conductive yarn is electrically insulated from the electrically resistive yarn.

According to an aspect of the present invention, the electrical resistance per unit of length of the electrically conductive yarn is less than 200 $\Omega$/m, preferably less than 50 $\Omega$/m, more preferably less than or equal to about 10 $\Omega$/m.

According to an aspect of the present invention, the electrical resistance per unit of length of the electrically resistive yarn is comprised between 10 k$\Omega$/m and 10 M$\Omega$/m, preferably comprised between 50 k$\Omega$/m and 500 k$\Omega$/m.

The electrically resistive yarn has a capacitance value that changes when an object touches it (a parasitic capacitance of the object is coupled to the electrically resistive yarn). The change in capacitance value of the resistive yarn is function of two main aspects: the parasitic capacitive coupling between the electrically resistive yarn and the object touching it, and the location on which the touching event occurred along the length of the resistive yarn with respect to the read-out point on which the capacitance value of the electrically resistive yarn is evaluated (i.e. with respect to the point on which the electrically resistive yarn is electrically connected to a detection device).

According to an aspect of the present invention, the electrically resistive yarn has a capacitance value that changes in response to a touch event; said change in value is a function of the location on which the touching event occurred along the length of the electrically resistive yarn with respect to the read-out point. In other words, when a touch event occurs on a point of the electrically resistive yarn, the capacitance value of the electrically resistive yarn evaluated at the read-out point (for example at an end of the electrically resistive yarn) changes in function of the length of the electrically resistive yarn comprised between the read-out point and the point on which the touch event occurred.

According to an aspect of the present invention, when an object touches the electrically conductive yarn, the change in capacitance value depends substantially only from the capacitive coupling between the electrically conductive yarn and the object touching it.

According to an aspect of the present invention, the electrically conductive yarn has a capacitance value that changes in response to a touch event; said change in value is substantially independent from the location on which the touching event occurred along its length.

Thanks to this aspect, a single composite yarn may be used for detecting the location of a touch event along its length by calculating the ratio between the capacitance values of the electrically resistive yarn and of the electrically conductive yarn. In other words, the capacitance value of the electrically resistive yarn evaluated with respect to the capacitance value of the electrically conductive yarn provides a value indicative of the position of a touch event along the length of the composite yarn independently from the capacitive coupling between the composite yarn and the object touching it.

According to an aspect of the present invention, the electrically conductive yarn and the electrically resistive yarn are coupled along their length. In other words, the electrically conductive yarn and the electrically resistive yarn are arranged adjacent, so that any cross-section of the composite yarn comprises part of both the electrically conductive yarn and electrically resistive yarn.

Preferably, the electrically conductive yarn and the electrically resistive yarn are coupled by twisting.

Advantageously, the electrically conductive yarn and the electrically resistive yarn form a sensing core of the composite yarn. Preferably, the composite yarn further comprises a sheath made of an electrically non-conductive material covering said sensing core. For example, the sheath may comprise an electrically non-conductive yarn having an electrical resistance per unit of length greater than 100 MΩ/m, more preferably greater than 1 GΩ/m.

According to an aspect of the present invention, the electrical resistivity of the electrically non-conductive material is greater than $10^3$ Ωm.

Preferably, the sheath comprises staple fibers made of the electrically non-conductive material, the sensing core being preferably core-spun with the staple fibers. More preferably the staple fibers are natural fibers (e.g. cotton).

According to an aspect of the present invention, the electrically resistive yarn is a plastic yarn filled with electrically conductive elements.

Preferably the electrically conductive yarn is an insulated metal wire (e.g. a copper magnet wire).

According to an aspect of the present invention, the electrical resistance per unit of length of the electrically conductive yarn is at least two order of magnitude less than the electrical resistance per unit of length of the electrically resistive yarn.

Preferably, the ratio between the values of electrical resistance per unit of length of the electrically resistive yarn and the electrically conductive yarn is in range of 100 to 1000000, more preferably 1000 to 100000.

A further object of the present invention is a capacitive touch sensor comprising at least one composite elongated element comprising an electrically conductive elongated element and an electrically resistive elongated element, wherein the electrically conductive elongated element is coupled to the electrically resistive elongated element, and wherein the electrically conductive elongated element is electrically insulated from the electrically resistive elongated element.

The term "elongated element" means an element having a shape similar to a thread (i.e. a thread-like element). An example of elongated element is a yarn. In general, in an elongated element, two of the three dimensions are much lower than and generally negligible with respect to the third dimension. For example, an elongated element may have the shape of a strip having width and thickness negligible with respect to the length. Preferably, elongated elements have two of the three dimensions comparable between them and negligible with respect to the third dimension (ideally a line). For example, elongated elements may be wires, yarns, filaments or traces of material arranged along a linear path. In an elongated element one of the three dimensions, i.e. the length, is at least ten times greater than the other two dimensions, preferably at least twenty times, more preferably at least fifty times.

According to an aspect of the present invention, the composite elongated element is the composite yarn according to the present invention. Some embodiments may provide that the capacitive touch tensor comprises at least one composite elongated element comprising a trace of electrically resistive material (as electrically resistive elongated element) and/or a trace of electrically conductive material (as electrically conductive elongated element) arranged along a substantially linear path.

According to an aspect of the present invention, the same values of electrical resistance per unit of length described above for electrically conductive and resistive yarns can be applied to electrically conductive and resistive elongated elements.

In other words, according to an aspect of the present invention, the electrical resistance per unit of length of the electrically conductive elongated element is less than 200 Ω/m, preferably less than 50 Ω/m, more preferably less than or equal to about 10 Ω/m.

According to an aspect of the present invention, the electrical resistance per unit of length of the electrically resistive elongated element is comprised between 10 kΩ/m and 10 MΩ/m, preferably comprised between 50 kΩ/m and 500 kΩ/m.

According to an aspect of the present invention, the electrical resistance per unit of length of the electrically conductive elongated element is at least two order of magnitude less than the electrical resistance per unit of length of the electrically resistive elongated element. Preferably, the ratio between the values of electrical resistance per unit of length of the electrically resistive elongated element and the electrically conductive elongated element is in range of 100 to 1000000, more preferably 1000 to 100000.

For example, the electrical resistance per unit of length of an elongated element, may be measured by following the standard AATCC Test Method 84-2005 or AATCC Test Method 84-2011.

The capacitive touch sensor preferably comprises a detection device configured to evaluate the capacitance values of the electrically resistive elongated element and of the electrically conductive elongated element of the composite elongated element (i.e. by using the self-capacitance sensing).

According to an aspect of the present invention, the detection device is configured to calculate the ratio between said capacitance values of the electrically resistive elongated element and of the electrically conductive elongated element and to provide an output signal indicative of the location of a touch event along the composite elongated element in function of this ratio.

Thanks to this aspect, only one composite elongated element may be used for detecting the location of a touch event along a determined direction (the direction along which the composite elongated element is arranged). For example, a touch sensor comprising only one composite elongated element (for example a composite yarn of the present invention) may be used as a swipe sensor with only two electrical contacts for connecting the electrically conductive and resistive elongated elements to the detection device.

According to an aspect of the present invention, the touch sensor comprises a plurality of composite elongated elements, wherein the detection device is configured to calculate the ratio between the capacitance values of the electrically resistive elongated element and of the electrically conductive elongated element for each composite elongated element and to provide an output signal indicative of the location of a touch event along each composite yarn of the plurality of composite elongated elements.

Preferably, the composite elongated elements are arranged substantially parallel to each other.

Thanks to this aspect, the composite elongated elements of the touch sensor can be electrically connected to the detection device along only a side of the touch sensor. In other words, the touch sensor allows to detect the location of a touch event on a X-Y reference plane by arranging a plurality of composite elongated elements parallel to each other along only one of the directions X or Y.

According to an aspect of the present invention, the composite elongated element or the plurality of composite elongated elements may be coupled to a support layer, preferably a fabric. Thanks to this aspect, the touch sensor may be embedded easily on a fabric.

Preferably, some embodiments may provide that the touch sensor is embedded in a woven fabric. More preferably, these embodiments provide that one or more composite yarns may be at least part of the warp or of the weft of the woven fabric.

Some embodiments of the present invention may provide that the detection device is connected to a communication module configured to transmit the output signal to an external device (e.g. a smartphone).

A further object of the present invention is a method for detecting the location of a touch event on a support layer comprising the following steps:
(a) providing a support layer comprising at least one composite elongated element comprising an electrically conductive elongated element and an electrically resistive elongated element, wherein the electrically conductive elongated element is coupled to the electrically resistive elongated element, and wherein the electrically conductive elongated element is electrically insulated from the electrically resistive elongated element;
(b) evaluating the capacitance values of the electrically resistive elongated element and of the electrically conductive elongated element of the at least one composite elongated element;
(c) calculating the ratio between the capacitance value of the electrically resistive elongated element and the capacitance value of the electrically conductive elongated element evaluated in the step (b);
(d) providing an output signal indicative of the location of said detected touch event in function of the ratio calculated in the step (c).

According to an aspect of the present invention, the support layer is a fabric, wherein the composite elongated element is the composite yarn according to the present invention.

BRIEF DESCRIPTION OF THE DRAWINGS

The invention will now be described in greater detail, by way of example, with reference to the accompanying non limiting drawings. It is emphasized that, according to common practice, the various features of the drawing are not necessarily to scale. On the contrary, the dimensions of the various features are arbitrarily expanded or reduced for clarity. Like numerals denote like features throughout the specification and the drawings in which.

DETAILED DESCRIPTION

Figure 1A:
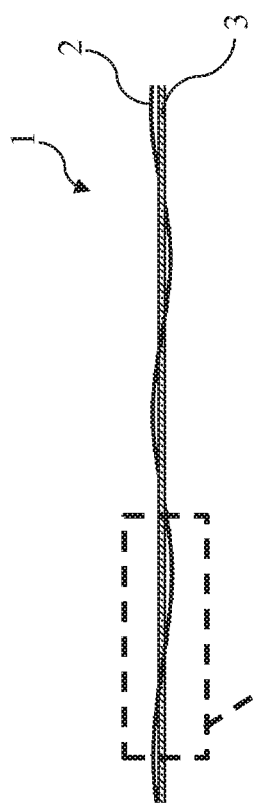
FIG. 1A schematically shows a perspective view of a composite yarn according to an embodiment of the present invention.
Figure 1B:
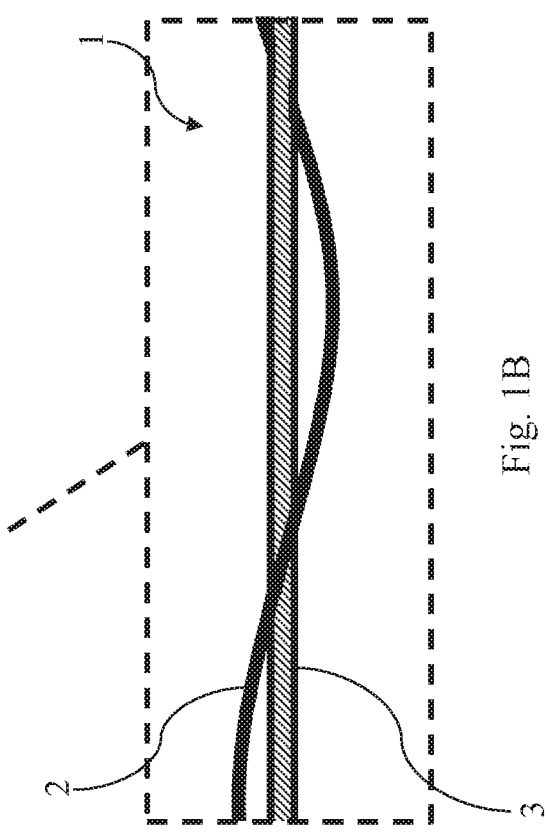
FIG. 1B is an expanded view showing a portion of the composite yarn shown in FIG. 1.

FIGS. 1A and 1B show an exemplary embodiment of a composite yarn 1 according to the present invention. The composite yarn 1 comprises an electrically conductive yarn 2 and an electrically resistive yarn 3 (that are visible more clearly in the enlarged view shown in FIG. 1B).

The electrically conductive yarn 2 and the electrically resistive yarn 3 are coupled together, preferably by twisting. For example, the electrically conductive yarn 2 may be core-spun with the electrically resistive yarn 3, or vice versa. Some embodiments may provide for example that the electrically conductive yarn 2 is preferably embroidered around the electrically resistive yarn 3, or vice versa. Other embodiments may provide that the electrically conductive yarn 2 and the electrically resistive yarn 3 are coupled together by other coupling process, such as by intermingling, spiraling and the like processes while remaining within the scope of protection of the present invention.

The electrically conductive yarn 2 is electrically insulated from the electrically resistive yarn 3, for example by an electrically insulating coating 2a provided on the surface of the electrically conductive yarn 2.

The electrically conductive yarn 2 is preferably an insulated metal wire, for example a magnet wire. A magnet wire, also called "enameled wire" is a metal wire (for example made of copper or aluminum) coated with a very thin layer of insulation.

Magnet wires are commercially available and are typically used in the construction of transformers, inductors, motors, speakers, hard disk head actuators, electromagnets, and other applications that require tight coils of insulated wire.

Preferably, the electrically conductive yarn 2 has an electrical resistance per unit of length Rc less than 200 Ω/m, more preferably less than 50 Ω/m, for example about 10 Ω/m. In other words, the cross section and the electrical resistivity of the electrically conductive yarn 2 are chosen to obtain a meter of electrically conductive yarn 2 having an electrical resistance less than 200Ω, more preferably less than 50Ω, for example about 10Ω.

For example, the electrically conductive yarn 2 may be made of a material having electrical resistivity less than $10^{-6}$ Ωm, more preferably less than $10^{-7}$ Ωm (e.g. silver, copper, gold, aluminum, platinum, iron may be suitable materials for the electrically conductive yarn 2).

Preferably, the electrically resistive yarn 3 has an electrical resistance per unit of length Rr comprised between 10 kΩ/m and 10 MΩ/m, more preferably comprised between 50 kΩ/m and 500 kΩ/m, for example about 200 kΩ/m. In other words, the cross section and the electrical resistivity of the electrically resistive yarn 3 are chosen to obtain a meter of electrically resistive yarn 3 having an electrical resistance comprised between 10 kΩ and 10 MΩ, more preferably comprised between 50 kΩ and 500 kΩ, for example about 200 kΩ.

For example, the electrically resistive yarn 3 has electrical resistivity comprised between $10^{-6}$ Ωm and $10^{3}$ Ωm, more preferably between $10^{-4}$ Ωm and $10^{-1}$ Ωm.

The electrically resistive yarn 3 is preferably a plastic yarn (e.g. nylon) filled with electrically conductive elements (e.g. electrically conductive carbon). More preferably, the electrically resistive yarn 3 may be a 80-denier nylon 6,6 having electrically conductive carbon suffused into its surface.

For example, a suitable electrically resistive yarn 3 may be the electrically resistive yarn available with the commercial name RESISTAT© F901, MERGE R080 that is a 80-denier nylon 6,6 monofilament which has electrically conductive carbon suffused into the surface. This particular resistive yarn has a round cross section with a coating thickness of about 1 μm, and a linear mass density of about 84 denier. The electrical resistance of this resistive yarn is about 0.8 $10^{5}$Ω per centimeter (i.e. about 80 kΩ/m).

According to an aspect of the present invention, the electrical resistance per unit of length of the electrically conductive yarn 2 is at least two order of magnitude less than the electrical resistance per unit of length of the electrically resistive yarn 3.

Preferably, the ratio Rr/Rc between the values of electrical resistance per unit of length of the electrically resistive yarn 3 and the electrically conductive yarn 2 is in range of 100 to 1000000, more preferably 1000 to 100000.

Figure 2A:
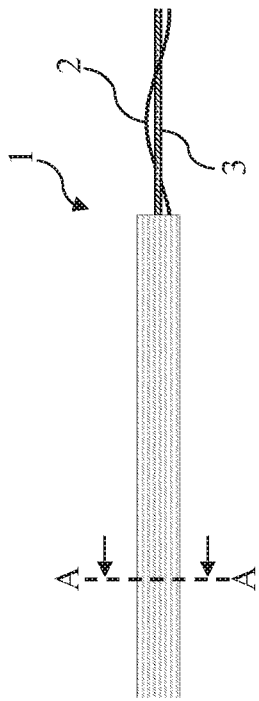
FIG. 2A schematically shows a perspective view of a composite yarn according to a further embodiment of the present invention.
Figure 2B:
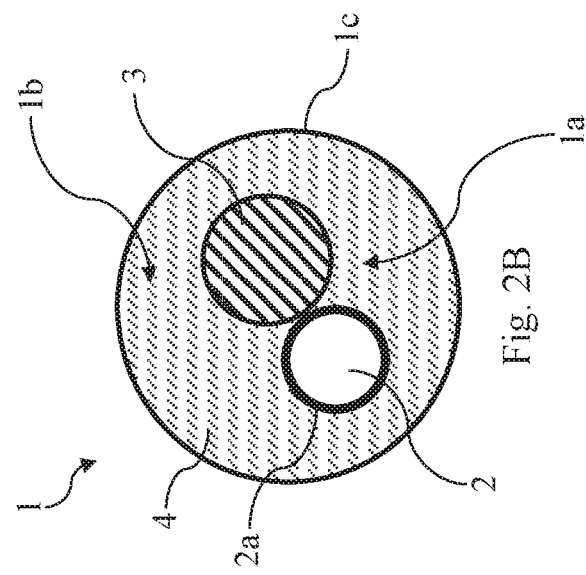
FIG. 2B is a cross section along the cutting plane A-A of the composite yarn shown in FIG. 2A.

With respect to FIGS. 2A and 2B, some embodiments of the present invention may provide that the composite yarn 1 comprises a sheath 1b made of an electrically non-conductive material. In these embodiments, the electrically conductive yarn 2 and the electrically resistive yarn 3 form a sensing core 1a covered by the sheath 1b.

The sheath 1b may be formed for example by an electrically non-conductive yarn having an electrical resistance per unit of length Rn greater than 100 MΩ/m, more preferably greater than 1 GΩ/m.

According to an aspect of the present invention, the sheath 1b of the composite yarn 1 comprises staple fibers 4 made of an electrically non-conductive material, preferably having electrical resistivity greater than $10^{3}$ Ωm, more preferably greater than $10^{6}$ Ωm.

The sensing core 1a is preferably core-spun with the staple fibers 4 of the sheath 1b. Some embodiments may provide that the sensing core 1a is embroidered around with the staple fibers 4 of the sheath 1b, or covered by other sheathing processes known in the art.

The staple fibers 4 are preferably natural fibers such as cotton, wool, silk and the like. Some embodiments may provide that the sheath 1b of the composite yarn 1 is provided with a dyeing 1c, for example an indigo dye.

The composite yarn 1 can be used for producing a capacitive touch sensor 10 able to be embedded for example in a fabric. In particular, an object of the present invention is a capacitive touch sensor 10 comprising at least one composite elongated element 1 comprising an electrically conductive elongated element 2 and an electrically resistive elongated element 3, wherein the electrically conductive elongated element 2 is coupled to the electrically resistive elongated element 3, and wherein the electrically conductive elongated element 2 is electrically insulated from the electrically resistive elongated element 3.

The electrically conductive elongated element 2 and the electrically resistive elongated element 3 are configured to be electrically connected to a detection device 5.

The detection device 5 is configured to evaluate the capacitance values CR, CC of the electrically resistive elongated element 3 and of the electrically conductive elongated element 2. The detection device is configured to calculate the ratio CR/CC between the capacitance values CR, CC of the electrically resistive elongated element 3 and of the electrically conductive elongated element 2, and to provide an output signal SOUT indicative of the location of a touch event along the composite elongated element 1 in function of the ratio CR/CC.

For the sake of simplicity, the following description of a touch sensor according to the invention refers to yarns and composite yarns as above disclosed, however the teaching of the description can be applied to a touch sensor having generic elongated elements in the place of yarns.

Figure 3:
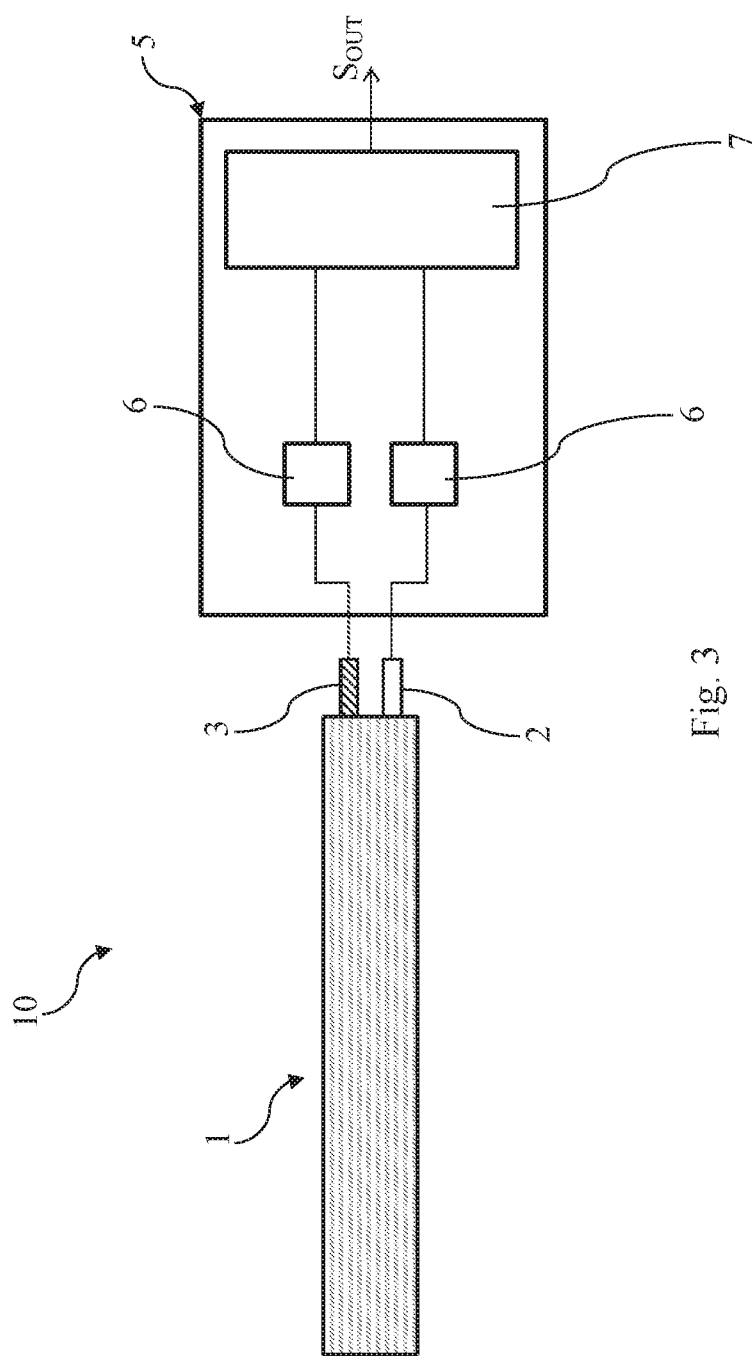
FIG. 3 schematically shows a perspective view of a touch sensor according to an embodiment of the present invention.

In particular, with respect to FIG. 3, the touch sensor 10 comprises at least one composite yarn 1, and a detection device 5 configured to evaluate the capacitance value CR of the electrically resistive yarn 3 and the capacitance value CC of the electrically conductive yarn 2.

The capacitance values CR and CC of the electrically conductive and resistive yarns 2, 3 may be evaluated for example by measuring the charging time, or the oscillation frequency of an oscillator, or by other measuring technics known in the art.

Some embodiments may provide that the detection device 5 comprises a front-end circuit 6 to which the electrically conductive and resistive yarns 2, 3 are connected.

For example, the front-end circuit 6 may comprise at least one oscillator (e.g. a Colpitts oscillator). The electrically conductive and resistive yarns 2, 3 are connected selectively to the oscillator that has (in absence of a touch event) a predetermined oscillation frequency.

A change of the capacitance values CR and CC of the electrically conductive and resistive yarns 2, 3 is detected as a change of the oscillation frequency of the oscillator. In other words, by evaluating the oscillation frequency of the oscillator, the capacitance values CR and CC of the electrically conductive and resistive yarns 2, 3 can be calculated.

Preferably, the detection device 5 comprises a microcontroller 7 connected to the front-end circuit 6, and configured to calculate the capacitance values CR and CC of the electrically conductive and resistive yarns 2, 3 on the basis of the oscillation frequency of the oscillator.

For example, the front-end circuit 6 comprises a sending terminal connected to a microcontroller 7 that sends a reference signal (e.g. a Boolean signal) to the sending terminal of the front-end circuit 6.

The front-end circuit 6 comprises a returning terminal that replicates the reference signal with a delay which is a function of the charging time of the electrically conductive and resistive yarns 2, 3. The capacitance values CR and CC of the electrically conductive and resistive yarns 2, 3 can be calculated on the basis of the delay evaluated.

The composite yarn 1 is electrically connected at a read-out point, preferably at one of its ends, to the detection device 5. In particular, one end of the electrically resistive yarn 3 is electrically connected to the detection device 5. Analogously, the respective end of the electrically conductive yarn 2 is electrically connected to the detection device 5.

Figure 4:
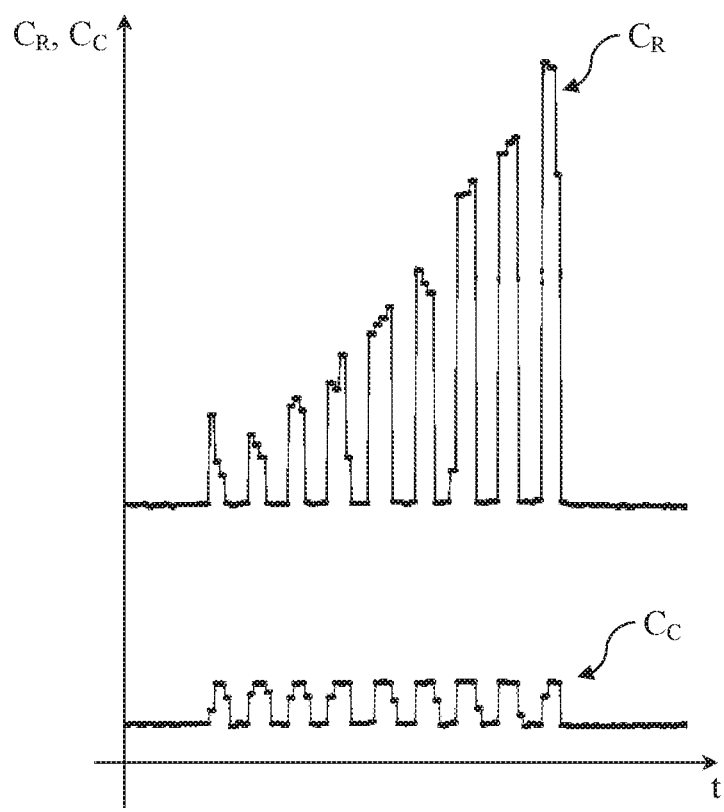
FIGS. 4 and 5 show two graphs in the time domain of the capacitance values of a composite yarn according to a particular embodiment of the present invention during two different types of touch events.
Figure 5:
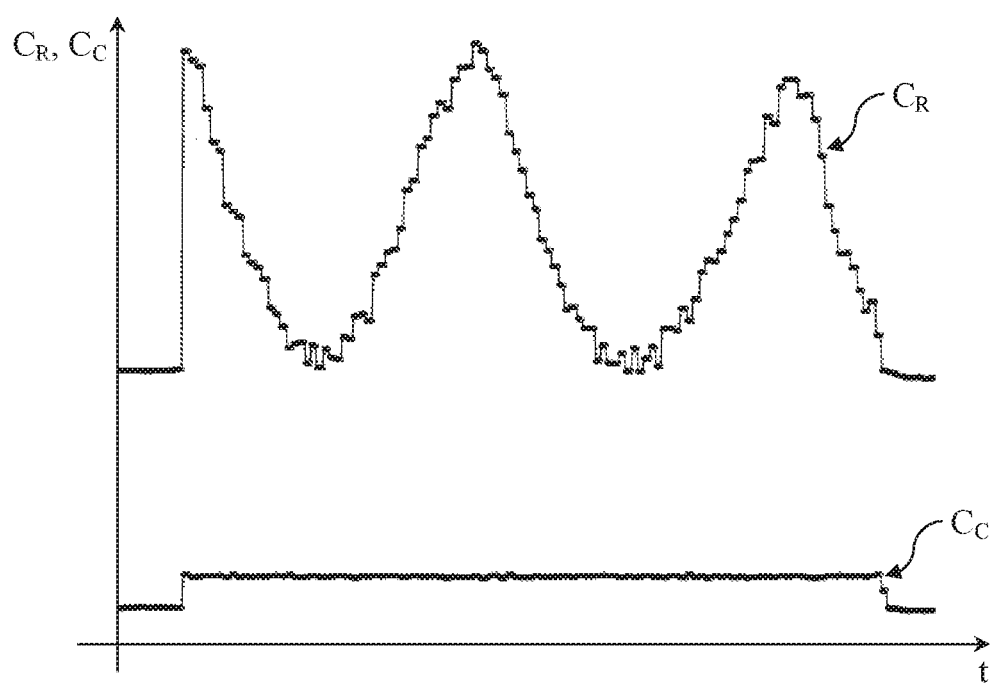

As shown in FIGS. 4 and 5, the capacitance value CC of the electrically conductive yarn 2 changes in response to touch events, irrespective of the position on which the touch events occurred along the composite yarn 1 with respect to the read-out point.

In other words, the capacitance value CC indicates if a touch event occurs and how much is strong the capacitive coupling between the electrically conductive yarn 2 and an object (e.g. a finger of a user) touching the composite yarn 1.

The capacitance value CR of the electrically resistive yarn 3 changes in response to touch events and in function of the position on which the touch events occurred along the composite yarn 1 with respect to the read-out point. In other words, if an object (e.g. a finger of a user) touches the composite yarn 1 in different positions along its length, the capacitance value CR changes in function of the position on which the touch events occurred along the composite yarn 1.

Basically, the electrically resistive yarn 3 can be represented with a lumped model of a capacitor in series with a resistor having a resistance value depending on the position of the touch event (i.e. the position on which the parasitic capacitance of the object is applied to the electrically resistive yarn 3). In the case of the electrically conductive yarn 2, the value of the electrical resistivity is so small that the dependency of the capacitive value CC from the position on which the touch event occurred is negligible.

In particular, FIG. 4 shows a graph in the time domain of the capacitance values CR and CC of a composite yarn 1 according to a particular embodiment of the present invention in response to a sequence of touch events performed by the finger of a user at a plurality of positions along the length of the composite yarn 1.

FIG. 5 shows the same graph of FIG. 4, when the finger of the user continuously swipes along the length of the composite yarn 1. A touch event far from the detection device 5 will be detected with a low capacitance value CR. When the touch event is performed near the detection device 5 (i.e. near to the read-out point), a high capacitance value CR will be detected.

The graphs shown in FIGS. 4 and 5 was obtained by touching a 10 cm composite yarn 1 comprising an insulating copper wire 2 (magnet wire) having a cross section with diameter of about 35 m twisted with an electrically resistive yarn 3 available with the commercial name RESISTAT© F901, MERGE R080 to form a sensing core 1a core-spun with a sheath 1b of cotton fibers.

However, the capacitance value CR of the electrically resistive yarn 3 changes also in function of the capacitive coupling between the electrically resistive yarn 3 and the object touching the composite yarn 1. Thus, from the capacitance value CR cannot be evaluated the position of the touch event without taking into account the capacitive coupling between the object and the electrically resistive yarn 3.

In other words, if the capacitive coupling between the electrically resistive yarn 3 and the object touching the composite yarn 1 changes (for example in the case of different users that have different parasitic capacitance values), the capacitance values CR of the electrically resistive yarn 3 evaluated in response to touch events on the same position along the composite yarn will be different.

The detection device 5 is advantageously configured to calculate the ratio CR/CC between the capacitance values CR and CC of the electrically resistive yarn 3 and of the electrically conductive yarn 2.

According to an aspect of the present invention the ratio CR/CC is indicative of the location of a touch event along the composite yarn 1 with a negligible dependency of the capacitive coupling between the object touching the composite yarn 1 and the electrically resistive and conductive yarns 2, 3. In other words, the value of the ratio CR/CC is indicative of the location of a touch event along the composite yarn 1 irrespectively of how strong is the capacitive coupling between the object touching the composite yarn 1 and the electrically resistive and conductive yarns 2, 3.

Preferably, the detection device 5 comprises a microcontroller 7 configured to calculate the ratio CR/CC of the evaluated capacitance values CR, CC. The detection device 5 is configured to provide an output signal SOUT in function of the ratio CR/CC that is indicative of the location of a touch event along the composite yarn 1.

Preferably, the output signal SOUT may return the value of the ratio CR/CC eventually multiplied by a coefficient k chosen for example in function of the length of the composite yarn 1. The output signal SOUT is preferably updated with a predetermined cadency having a refresh period (e.g. some milliseconds) during which the capacitance values CR and CC are reevaluated for updating the ratio CR/CC.

For example, the touch sensor 10 shown in FIG. 3 may be used for detecting not only the direction of a swipe, but also on which region of the composite yarn 1 a swipe occurred. Touch events may be detected with precision and reliability along a sensing region of a fabric on which the composite yarn 1 is coupled. In other words, with a single composite yarn 1, the touch sensor 10 of the present invention may distinguish different swipes in different regions of a fabric.

The composite yarn 1 (or in general the composite elongated element 1) may be coupled to a fabric (or to a generic support layer) by sewing, by knitting, by weaving, or by any other coupling technique known in the art.

For example, some embodiments may provide that the composite elongated element 1 comprises a trace of electrically resistive material (as electrically resistive elongated element 3) and/or a trace of electrically conductive material (as electrically conductive elongated element 2) arranged along a substantially linear path.

Such traces may be produced for example including a biopolymer (such as microbial cellulose, microbial collagen, cellulose/chitin copolymer, microbial silk, or a mixture thereof) with electrically conductive material (such as carbonaceous material, preferably selected from the group consisting of activated carbon, high surface area carbon, graphene, graphite, activated charcoal, carbon nanotubes, carbon nanofibers, activated carbon fibers, graphite fibers, graphite nanofibers, carbon black and mixtures thereof). A preferred embodiment provides that the biopolymer is microbial cellulose.

For example, electrically conductive material may be provided to the biopolymer (e.g., to a biopolymer layer or trace) by printing (e.g., screen printing and/or digital printing), or by localized impregnation.

According to an embodiment, a culture containing biopolymer-producing microorganisms comprises electrically conductive material. For example, a support layer may be contacted with a culture including biopolymer-producing microorganisms and an electrically conductive material. The microorganisms may be cultured to produce a biopolymer including electrically conductive material, so that the support layer is provided with a trace of electrically resistive material made of biopolymer comprising electrically conductive material.

A suitable process for producing patterns, or traces, of electrically resistive material by means of biopolymer is described in the European patent application No. EP18197348.8 in the name of the present Applicant, having title: "A PROCESS FOR PROVIDING A TEXTILE WITH ELECTRICAL CONDUCTIVITY PROPERTIES", the content of which is incorporated herein by reference as if set forth in its entirety.

Some embodiments may provide that the touch sensor 10 comprises a plurality of composite yarns 1, for example coupled to a fabric to provide a plurality of sensing regions. These embodiments provide that the detection device 5 is configured to calculate the ratio CR/CC between the capacitance values of the electrically resistive yarn 2 and of the electrically conductive yarn 3 for each composite yarn 1. The output signal provided by the detection device is indicative of the location of a touch event along each composite yarn 1 of the plurality of composite yarns.

Preferably, the composite yarns 1 are arranged substantially parallel to each other. This arrangement allows to provide a touch pad able to detect a touch event and the location of the touch event on the sensing region on which the composite yarns 1 are arranged, and wherein the composite yarns 1 may be arranged only in one direction (vertical or horizontal) and can be connected to the detection device 5 only on one side of the touch pad.

Figure 6:
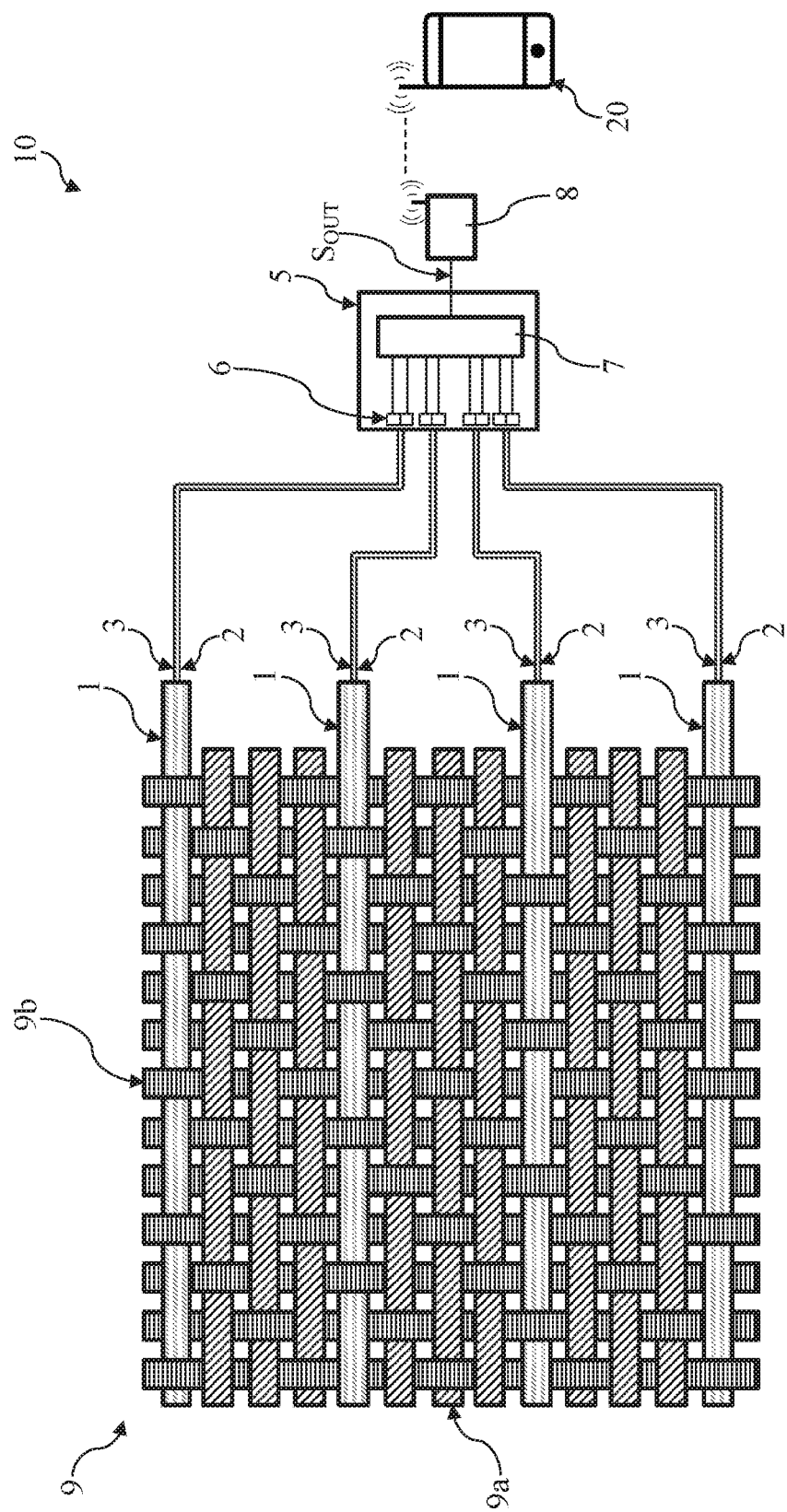
FIG. 6 schematically shows a perspective view of a touch sensor according to an embodiment of the present invention.

In particular, FIG. 6 shows an embodiment of the touch sensor 10 according to the present invention wherein a plurality of composite yarns 1 are woven on a fabric 9. The fabric 9 is preferably a denim fabric or in general a woven fabric. The embodiment of FIG. 6 provides for example that the weft of the fabric 9 comprises a plurality of composite yarns 1 arranged between other weft yarns 9a made of textile material. However, other embodiments may provide that the warp of the fabric 9 comprises a plurality of composite yarns 1 arranged between other warp yarns 9b made of textile material. Some embodiments may provide that all the yarns of the warp or of weft are composite yarns 1 while remaining in the scope of protection of the present invention. In general, the touch sensor 10 may comprise a plurality of composite yarns 1 that are at least part of the warp or of the weft of a woven fabric 9. The electrically resistive yarns 2 and of the electrically conductive yarns 3 of the composite yarns 1 are connected to the front-end circuit 6 of the detection device 5, so that the microcontroller 7 of the detection device 5 can calculate the ratio CR/CC between the capacitance values CR and CC of the electrically resistive yarn 2 and of the electrically conductive yarn 3 for each composite yarn 1. The output signal SOUT provided by the detection device 5 is indicative of the location of a touch event along each composite yarn 1 of the plurality of composite yarns 1.

For example, the output signal SOUT may return a set of values of a scanning sequence, wherein each value of the scanning sequence is the ratio CR/CC (eventually multiplied by a coefficient k chosen for example in function of the length of the composite yarn 1) of each composite yarn 1. The values of the ratio CR/CC of each scanning sequence are provided with a predetermined order (for example from the upper to the lower or vice versa). The output signal SOUT is preferably updated with a predetermined cadency having a refresh period during which the capacitance values CR and CC of each composite yarn 1 are reevaluated for updating the sequence of the values of the ratio CR/CC.

The touch sensor 10 of the present invention may be used for controlling or sending a control command to an external device 20. Some embodiments may provide that the detection device 5 is connected to a communication module 8 configured to transmit the output signal SOUT to an external device 20. Preferably, the communication module 8 is a wireless communication module (e.g. Bluetooth module, WiFi module, Infrared module, and the like).

For example, the composite yarn(s) 1 of the touch sensor 10 may be coupled to a fabric 9 for producing a garment (preferably a jacket or a pair of pants) having a sensing region that allows the wearer to control an external device 20 (e.g. a smartphone, a music player or the like) in a simple and reliable way.

For example, the touch sensor 10 may be coupled to a fabric 9 for lining a seating furniture (preferably a sofa or an armchair) on a sensing region (e.g. on the arms of the seating furniture) for allowing the sitting user to control an external device 20 (e.g. a smart TV, a stereo or the like) easily.

Summarizing, a method for detecting the location of a touch event on a support layer comprises the following steps:
(a) providing a support layer (preferably a fabric 9) comprising one or more composite yarns 1 according to the present invention;
(b) evaluating the capacitance values CR and CC of the electrically resistive yarn 3 and of the electrically conductive yarn 2 of each composite yarn 1; (c) calculating the ratio CR/CC between the capacitance value CR of the electrically resistive yarn 3 and the capacitance value CC of the electrically conductive yarn 2 evaluated in the step (b);
(d) providing an output signal SOUT in function of the ratio CR/CC calculated in the step (c) that is indicative of the location of a touch event.

Preferably, the method comprises a step of detecting a touch event, preferably in function of the capacitance value CC of the electrically conductive yarn 2 evaluated in the step (b). The touch event may be detected for example by comparing the capacitance value CC evaluated in the step (b) with a threshold value. In this embodiment, the steps (c) and (d) are carried out when a touch event is detected (in absence of a detected touch event the output signal SOUT is kept to a predetermined value indicative of absence of touch event).

The invention claimed is:

1. A composite yarn (1) comprising an electrically conductive yarn (2) and an electrically resistive yarn (3), wherein said electrically conductive yarn (2) is coupled to said electrically resistive yarn (3), and wherein the electrically conductive yarn (2) is electrically insulated from the electrically resistive yarn (3), wherein said electrically resistive yarn (3) is a plastic yarn filled with electrically conductive elements.

2. The composite yarn (1) according to claim 1, wherein said electrically conductive yarn (2) and said electrically resistive yarn (3) are coupled by twisting.

3. The composite (1) yarn according to claim 1, wherein said electrically conductive yarn (2) and said electrically resistive yarn (3) form a sensing core (1a) of said composite yarn (1), said composite yarn (1) further comprising a sheath (1b) made of an electrically non-conductive material covering said sensing core (1a).

4. The composite yarn (1) according to claim 3, wherein said sheath (1b) of said electrically non-conductive material comprises staple fibers (4), said sensing core (1a) being preferably core-spun with said staple fibers (4).

5. The composite yarn (1) according to claim 4, wherein said staple fibers (4) are natural fibers.

6. The composite yarn (1) according to claim 1, wherein said electrically conductive yarn (2) is an insulated metal wire.

7. The composite yarn (1) according to claim 1, wherein the electrical resistance per unit of length Rc of said electrically conductive yarn (2) is at least two order of magnitude less than the electrical resistance per unit of length Rr of said electrically resistive yarn (3), preferably Rr/Rc is in range of 100 to 1000000.

8. A capacitive touch sensor (10) comprising at least one composite elongated element (1) comprising an electrically conductive elongated element (2) and an electrically resistive elongated element (3), wherein said electrically conductive elongated element (2) is coupled to said electrically resistive elongated element (3), and wherein the electrically conductive elongated element (2) is electrically insulated from the electrically resistive elongated element (3), said electrically conductive elongated element (2) and said electrically resistive elongated element (3) being configured to be electrically connected to a detection device (5) configured to evaluate the capacitance values (CR, CC) of the electrically resistive elongated element (3) and of the electrically conductive elongated element (2) of said composite elongated element (1), said detection device (5) being configured to calculate the ratio (CR/CC) between said capacitance values (CR, CC) of the electrically resistive elongated element (3) and of the electrically conductive elongated element (2) and to provide an output signal (SOUT) indicative of the location of a touch event along said composite elongated element (1) in function of said ratio (CR/CC).

9. The capacitive touch sensor (10) according to claim 8 comprising a plurality of said composite elongated elements (1), wherein said detection device (5) is configured to calculate the ratio (CR/CC) between said capacitance values (CR, CC) of the electrically resistive elongated element (3) and of the electrically conductive elongated element (2) for each composite elongated element (1) of said plurality of composite elongated elements (1) and to provide an output signal (SOUT) indicative of the location of a touch event along each composite elongated element (1) of said plurality of composite elongated elements (1).

10. The capacitive touch sensor (10) according to claim 9 wherein said composite elongated elements (1) are arranged substantially parallel to each other.

11. The capacitive touch sensor (10) according to claim 8, wherein said one or more composite elongated elements (1) are coupled to a support layer.

12. The capacitive touch sensor (10) according to claim 11, wherein said support layer is a fabric (9).

13. The capacitive touch sensor (10) according to claim 11, wherein said support layer is a woven fabric (9) and wherein said one or more composite elongated elements (1) are at least part of the warp or of the weft of said woven fabric (9).

14. The capacitive touch sensor (10) according to claim 8, wherein said at least one composite elongated element (1) is a composite yarn comprising an electrically conductive yarn (2) and an electrically resistive yarn (3), wherein said electrically conductive yarn (2) is coupled to said electrically resistive yarn (3), and wherein the electrically conductive yarn (2) is electrically insulated from the electrically resistive yarn (3).

15. The capacitive touch sensor (10) according to claim 8, wherein said detection device (5) is connected to a communication module (8) configured to transmit said output signal (SOUT) to an external device (20).

16. A method for detecting a touch event and the location of said touch event on a support layer wherein said method comprises the following steps:
  (a) providing a support layer comprising at least one composite elongated element (1) comprising an electrically conductive elongated element (2) and an electrically resistive elongated element (3), wherein said electrically conductive elongated element (2) is coupled to said electrically resistive elongated element (3), and wherein the electrically conductive elongated element (2) is electrically insulated from the electrically resistive elongated element (3);
  (b) evaluating the capacitance values (CR, CC) of the electrically resistive elongated element (3) and of the electrically conductive elongated element (2) of said at least one composite elongated element (1);
  (c) calculating the ratio (CR/CC) between the capacitance value (CR) of the electrically resistive elongated element (3) and the capacitance value (CC) of the electrically conductive elongated element (2) evaluated in said step (b);
  (d) providing an output signal (SOUT) indicative of the location of said detected touch event in function of said ratio (CR/CC) calculated in said step (c).

17. The method according to claim 16, wherein said support layer is a fabric (9), and wherein said at least one composite elongated element (1) is a composite yarn comprising an electrically conductive yarn (2) and an electrically resistive yarn (3), wherein said electrically conductive yarn (2) is coupled to said electrically resistive yarn (3), and wherein the electrically conductive yarn (2) is electrically insulated from the electrically resistive yarn (3).

* * * * *